United States Patent [19]

Kikuchi et al.

[11] Patent Number: 5,073,693
[45] Date of Patent: Dec. 17, 1991

[54] METHOD FOR JOINING METALLIC MEMBERS

[75] Inventors: Hiroyoshi Kikuchi; Hiroto Kosuge; Syunsuke Suzuki, all of Narashino, Japan

[73] Assignee: NDC Co., Ltd., Chiba, Japan

[21] Appl. No.: 417,945

[22] Filed: Oct. 6, 1989

[30] Foreign Application Priority Data

Feb. 8, 1989 [JP] Japan .............................. 1-13085[U]
Feb. 8, 1989 [JP] Japan ..................... 1-27370

[51] Int. Cl.$^5$ ............................................. B23K 11/14
[52] U.S. Cl. ........................................ 219/93; 219/118
[58] Field of Search ............... 219/93, 117.1, 118

[56] References Cited

U.S. PATENT DOCUMENTS

| | | | |
|---|---|---|---|
| 2,861,115 | 11/1958 | Berg | 219/117.1 |
| 3,067,488 | 12/1962 | Rennett et al. | 219/93 |
| 3,242,562 | 3/1966 | Kraft | 219/117.1 |
| 3,936,656 | 2/1976 | Middleton et al. | 219/117.1 |
| 4,495,397 | 1/1985 | Opprecht et al. | 219/93 |
| 4,722,824 | 2/1988 | Wiech, Jr. | 219/93 |
| 4,829,152 | 5/1989 | Rostoker et al. | 219/117.1 |

FOREIGN PATENT DOCUMENTS

56-11375 3/1981 Japan .

*Primary Examiner*—Clifford C. Shaw
*Attorney, Agent, or Firm*—Sughrue, Mion, Zinn, Macpeak & Seas

[57] ABSTRACT

A method for joining a porous metallic member and a non-porous metallic member includes by passage of an electric current after forming a dense portion on a joining surface of the porous metallic member by caving a projection provided on a joining surface of the non-porous metallic member into said porous metallic member whereby both metallic members are joined firmly without using screws or adhesives.

2 Claims, 7 Drawing Sheets

METHOD FOR JOINING METALLIC MEMBERS

BACKGROUND OF THE INVENTION

1. Field of The Invention

This invention relates to a method for joining metallic members used for joining a porous metallic member and a non-porous metallic member, for example, used for joining a porous aluminum sound-absorbing panel board with metal fitting of said sound-absorbing panel board.

2. Description of The Prior Art

Herefore, there has been porous metalic materials manufactured through various procecces such as powder-sintering, molten metal-foaming, fiber press-forming, and the like. Among them, porous metallic materials having a porosity not less than 30% are useful for sound-absorbing materials.

Previously, a process possible to obtain porous aluminum with a porosity of 30 to 70% by sintering a mixture of aluminum (inclusive aluminum alloys) powder and additional powder having a melting point lower than that of said aluminum powder at a temperature lower than melting point of said aluminum powder in a non-oxidizing atmosphere was developed (Japanese Patent Publication No. 56-11375/81, U.S. Pat. No. 4,283,465).

Said porous aluminum materials are considerably light as compared with non-porous materials because of a porosity of 30 to 70%, and receive wide application such as sound-absorbing materials for various machinery because of excellent acoustic absorptiveness thereof, furthermore it is used abundantly for a sound-absorbing board as constructive materials.

In case such a porous aluminum board is used for a wall, a ceiling or the like in the interior and exterior of the building, it is required to use a large number of porous aluminum members in the shape of flat and rectangular boards. When the porous aluminum members are fixed to a base frame as shown in FIGS. 12 and 13, a porous metallic board 101 is fixed to the base frame 102 in a state in which the porous metalic board 101 is kept on said base frame 102 with screws 103 or adhesives, or combination of them.

Figures 12, 13:
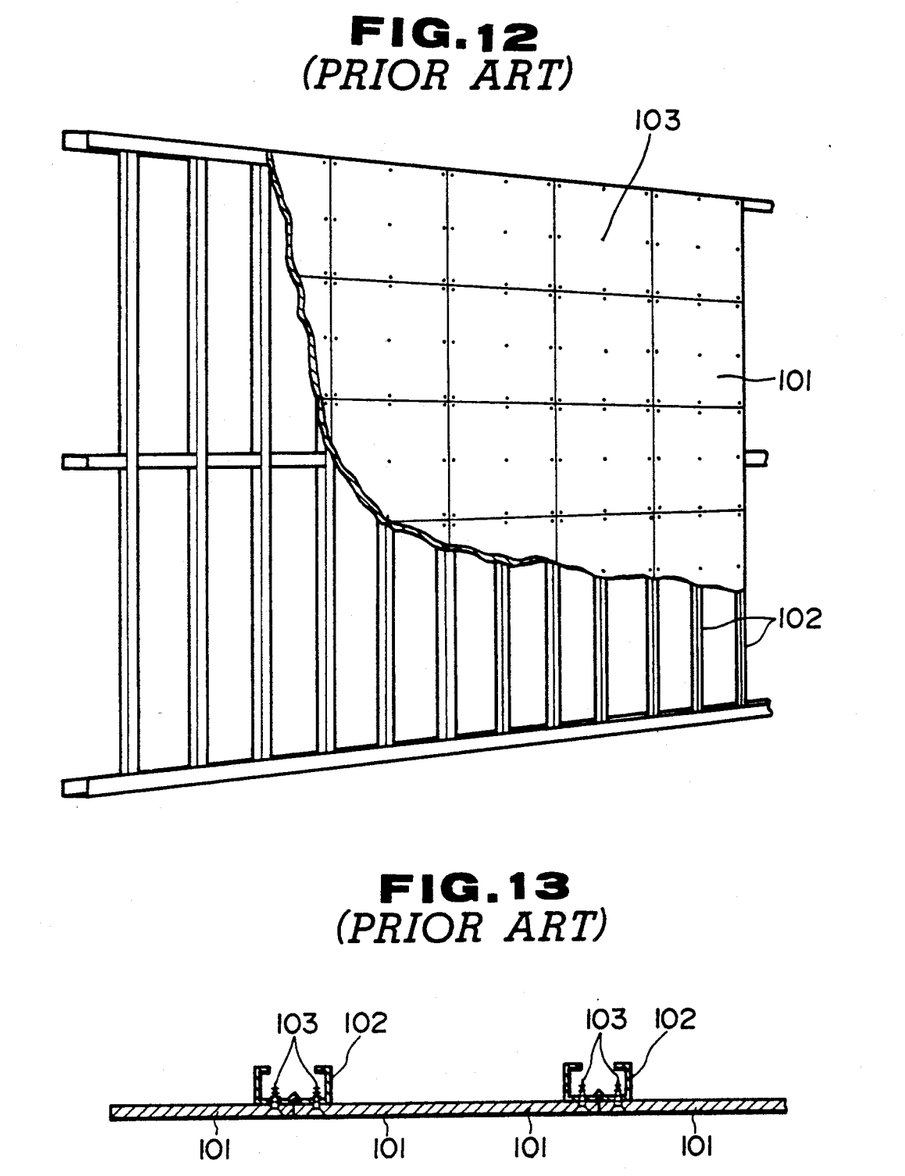
FIG. 12 is a partially sectional perspective view illustrating the situation in which the porous matallic members are constructed to the wall according to the conventional method.
FIG. 13 is an enlarged sectional view illustrating the state in which the porous metallic members shown in FIG. 12 are fixed to the base frame.

However, attaching the porous aluminium members with screws and adhesives, for example in case of the screw clamping shown in FIGS. 12 and 13, the head of said screw 103 is exposed heterogeneously on the surface of the porous aluminum members, therefore there is a problem in that an appearance of the surface becomes unattractive especially in case the porous aluminum member is used as a sound-absorbing panel for an interior decoration. There are other problems in that it is not possible to obtain a sufficient strength, and adhesive property deteriorates with passage of time in case adhesives are used.

SUMMARY OF THE INVENTION

The present invention is made in view of the above mentioned problems of the prior art and it is an object to provide a method for joining metallic members wherein it is possible to join a porous metallic member used for a sound-absorbing member and a non-porous metallic member used for metal fittings to to provide fittings on the sound-absorbing member with out using screws or adhesives.

The method for joining metallic members according to this invention for attaining the above-mentioned object is characterized by putting a joining surface of a porous metallic member together with a joining surface of a non-porous metallic member having a projection on the joining surface, pressurizing said both metallic members in direction of contact with each other and forming a dense portion (having a low porosity) on the joining surface of said porous metallic member by pressing the projection provided on the joining surface of said non-porous matallic member into said porous metallic member, and subsequently heating and joining said both metallic members by passage of an electric current.

BRIEF DESCRIPTION OF THE DRAWINGS

FIGS. 1 to 3 are illustrations explaining the method for joining metallic members according to this invention.

FIGS. 4 to 11 show examples applying the method for joining metalic members according to this invention

DETAILED DESCRIPTION OF THE INVENTION

When the joining of metalic members of which at least one is porous is performed by means of, for example MIG welding process or TIG welding proces used for the joining of general non-porous metallic members, it is difficult to form the welding bead on the porous metallic member uniformly and a hole sometimes appears due to partial melting down because the porous aluminum panel board, that is, the porous metallic member used for sound-absorbibing materials has through pores with a porosity of 30 to 70%, for example. These welding processes are unfavorable to weld the sound-absorbing board for interior decoration which needs an ornamentality, because an affected zone is formed by heat on the surface of the reverse side of the joining surface even if said porous metallic members are welded satisfactorily.

Joining the metallic members in contact with each other, of which at least one is porous, by means of spot welding process, there is little possibility to join them with a constant welding current because a contacting area of a metallic member with another metallic member is remarkably small and is not constant.

Figure 3:
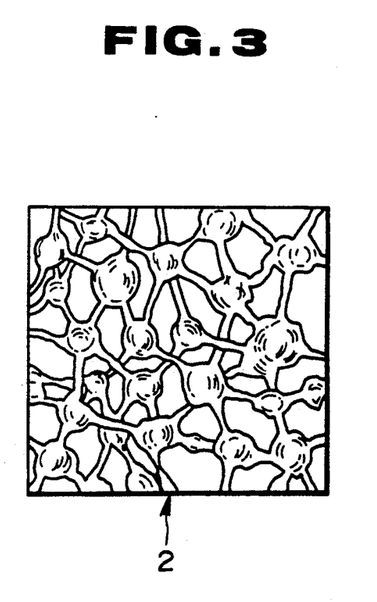
FIG. 3 is a enlarged detail showing threedimensional network structure of the porous metalic member.

There is what is called a projection welding process that comprises putting together both joining surfaces of metallic members provided with a projection on one side, and applying pressure to said joining surface at the same time said projection is heated locally by passage of an electric current. However, in case of applying said projection welding process to the joining of the porous metallic member with the non-porous metallic member by providing the projection on the joining surface of said non-porous member, the portion of the porous metallic member in contact with said projection is also melted down together with the melting of said projection, the molten metal flows into the porous portion of said porous metallic member having three-dimensional structure as shown in FIG. 3 and the melting down is extended successively into the deep portion. Therefore, it was found that above mentioned projection welding process was not applicable to the joining for the porous metallic members because the other side surface of the joining surface was deteriorated or melted down.

Figure 1:
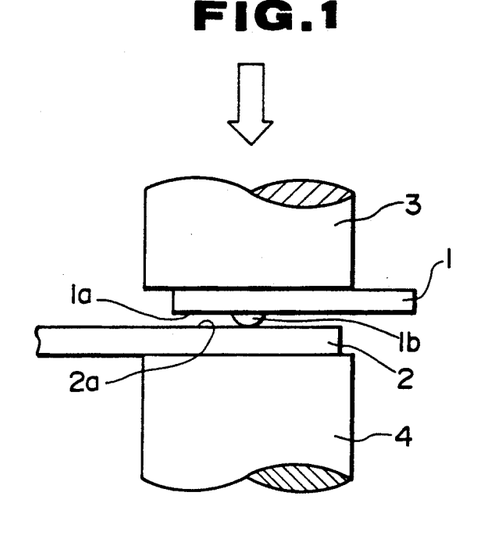
FIGS. 1 and 2 are a side view and a partial sectional side view illustrating the situation before and after pressing the porous metallic member and non-porous metallic member against each other respectively.

Accordingly, in this invention, firstly, at least one projection 1b is formed on a joining surface 1a of a non-porous metallic member 1, and said non-porous metallic member 1 having the projection 1b is put together on a joining surface 2a of a porous metallic member 2 as shown in FIG. 1. Secondly, pressurizing said metallic members 1 and 2 by operating at least one of electrodes 3 and 4, said projection 1b formed on the joining surface 1a of the non-porous metallic member 1 sinks into said joining surface 2a of the porous metallic member 2, and a dense portion 2b pressed in by said projection 1b and having a low porosity is formed on the joining surface 2a of the porous metallic member 2. In such a state, the current flows through the projection 1b and the dense portion 2b mainly, so that the projection 1b and the dense portion 2b are melted and said metallic members 1 and 2 are joined after solidification.

Hereupon, said porous metallic member 2 is melted abundantly in the vicinity of the contacting portion with said projection 1b where electric resistance increases, the molten metal does not flow into the porous metallic member 2. Therefore, the deterioration or the melting on the other side surface of the joining surface never occurs. At the time of pressurization previous to passage of an electric current it is not always necessary to pressurize until the joining surface 1a and 2a come in touch with each other, namely the dense portion 2b is formed by pressing the projection 1b in halfway and it is also possible according to circumstance to put the joining surfaces 1a and 2a together by pressing said projection 1b entirely into the porous member after raising the temperture by passage of an electric current.

The porous metallic member used in the method for the joining of metallic members according to this invention is not restricted in its material, shape, porosity and so on. For example, porous aluminum with a porosity of 30 to 70% or so, which is made by sintering a mixture of aluminum (inclusive aluminum alloys) powder and additional powder having a melting point lower than that of said aluminum powder at a temperature lower than melting point of said aluminum powder in a non-oxidizing atomosphere, may be used. In addition to above, the porous metallic member manufactured by forming a molten metal or by press-forming fibrous materials may be used.

The non-porous metallic member to be joined with said porous metallic member is not restricted in its material, shape and the like, and the non-porous metallic member of which the material and the shape comform to those of the porous metallic member and the purpose of the joint may be used.

To form one or plural projections on the joining surface of said non-porous metallic member, it is possible to adopt the method of forming the projection by pressing a metallic plate and deforming it partially (the reverse side surface of the projection sinks), or the method of forming a metallic bracket with the projection on one side by forging or casting (the reverse side surface of the projection does not always sink). Said method of forming the projection is not restricted similarly, and the number of projections can be selected suitably according to the size of the porous metallic member, the required joining strength and so on.

At the joining of the metallic members, the joining surface of said porous metallic member is put together with said joining surface of the non-porous metallic member having at least one projection, and pressurizing said both metallic members in the direction that both the joining surfaces come close to each other, the dense portion is formed by pressing the projection into the joining surface of said porous metallic member wholly or leaving a base part of said projection. By passing an electrical current in such a situation, the circumference of the projection is heated and melted and so, both metallic members are joined at the projection by applying pressure according to need.

The concrete example of the method for the joining of metallic members according to this invention will be described below.

Using an aluminum plate of 2 mm thickness as a non-porous metallic member 1, a projection 1b having a height of 1.8 mm and a maximum diameter of 5 mm was formed on a joining surface 2a of said non-porous metallic member 1 by ordinary press-forming. Hereupon, the number of projections 1b was decided in conformity to a size of the non-porous metallic member 1 and a porous metallic member 2 for use and so on, a size of the projection 1b was decided in conformity to the thickness of the porous metallic member 2 and so on.

A porous aluminum sintered plate of 2.5 mm thickness was used as the porous metallic member 2.

Figure 2:
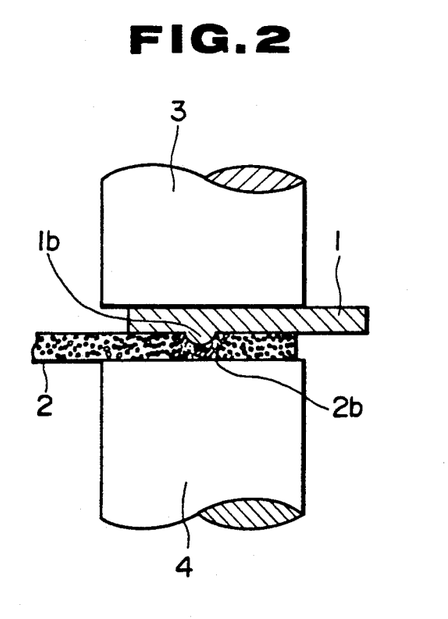

Putting said non-porous metallic member 1 and said porous metallic member 2 between copper electrodes 3 and 4 as shown in FIG. 1, subsequently letting the electrode 3 down, said electrode 3 pressed the projection 1b against the joining surface 2a of the porous metallic member 2 with a pressure of 10 to 80 kgf/cm$^2$ (pressure per unit area of the electrodes 3 and 4) as shown in Table 1, and a dense portion 2b in which pores disappear was formed in the vicinity of the projection 1b by pressing the projection 1b formed on the joining surface 1a of the non-porous metallic member 1 into the joining surface 2a of the porous metallic member 2 as shown in FIG. 2.

Next, applying an electric current between electrodes 3 and 4 under the condition of 8000A and 15 V at the same time pressurization is over, the projection 1b and the dense portion 2b in the vicinity of said projection 1b were melted and fused into one. And the state of joining was examined after solidification. Obtained results is shown in Table 1.

TABLE 1

| Pressure (kgf/cm$^2$) | 10 | 15 | 20 | 30 | 40 | 50 | 60 | 70 | 80 |
|---|---|---|---|---|---|---|---|---|---|
| Quality | Δ | o | o | o | o | o | Δ | x | x |

As apparent from Table 1, in this example the joining could be performed satisfactory in pressure range from 15 to 50 kgf/cm$^2$, and pores remained between the dense portion 2b and the reverse side surface of the joining surface 2a, there were no defects such as boring and deterioration on the surface. However, in case the pressure was too low, it was confirmed that deterioration on the surface occured because the dense portion 2b is not formed so widely, melting of the porous metallic member 2 spreed to the circumference of the projection 1b with melting of said projection 1b, and the molten metal flows into the porous portion. Furthermore, it was also confirmed that the pressure too high was undesirable for the joining because over-all deformation becomes large and the appearance gets worse. It was found that it is desirable to establish the proper conditions such as pressure, current, voltage and so on separately in case the non-porous metallic member 1 formed with plural projections 1b on the joining surface 1a may be used.

The other examples applied the method for joining metallic members according to this invention will be described below on basis of FIGS. 4 to 11.

Figure 4:
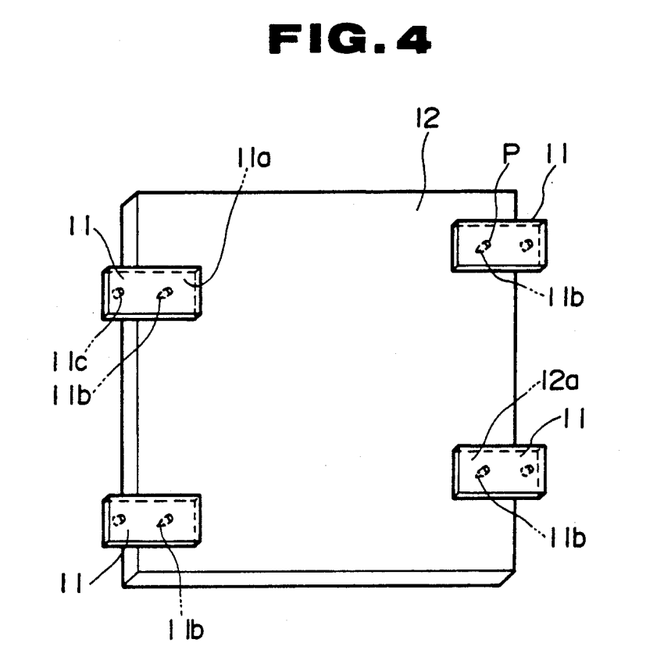
FIG. 4 is a perspective view illustrating the example of the porous panel board joined with the metal fittings by applying the method according to this invention.

In the next example, an aluminum, sound-absorbing panel board that is a porous metallic member is a rectangular board as shown in FIG. 4. Such sound-absorbing panel board is finished into a small size (about 500×500 mm) comparatively because it is easy to induce deformation such as bending by handling. Two metal fittings (40×80×2 mm) 11 are fixed (four in total) to each side of the aluminum sound-absorbing panel board 12 having said size and thickness of 2.5 mm in symmetry of location as shown in FIG. 4. Said metal fittings 11 are provided with a projection 11b formed by pressing and protruding in the side of a joining surface 11a at the part shifted to one end thereof, and are provided with a screw hole 11c at the part shifted to another end thereof as shown in FIG. 5.

Figure 5:
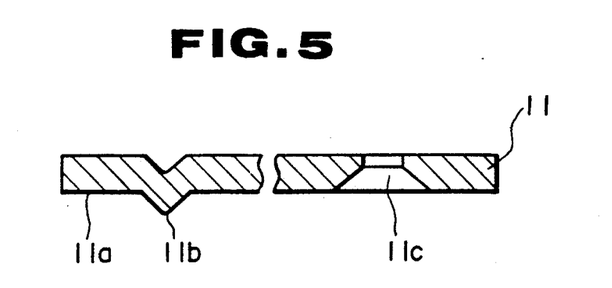
FIG. 5 is an enlarged sectional view of the metal fittings shown in FIG. 4.

At the occasion of fixing the metal fittings 11 which are non-porous metallic members shown in FIG. 5 to the aluminum sound-absorbing panel board 12, putting said joining surface 11a into contact of said metal fittings 11 with a joining surface 12a of said aluminum sound-absorbing panel board 12 and pressurizing them, a partially dense portion is formed in the vicinity of the projection 11b on the aluminum sound-absorbing panel board 12 by pressing the whole body or a part leaving the base part of the projection 11b into said aluminum sound-absorbing panel board 12. Next, passing an electric current between the electrodes in this state, said both joining surfaces 11a and 12a are heated and fused, furthermore pressurized according to need, thereby said metal fittings 11 are joined to the aluminum sound-absorbing panel board 12 at a position P shown in FIG. 4.

Figure 6:
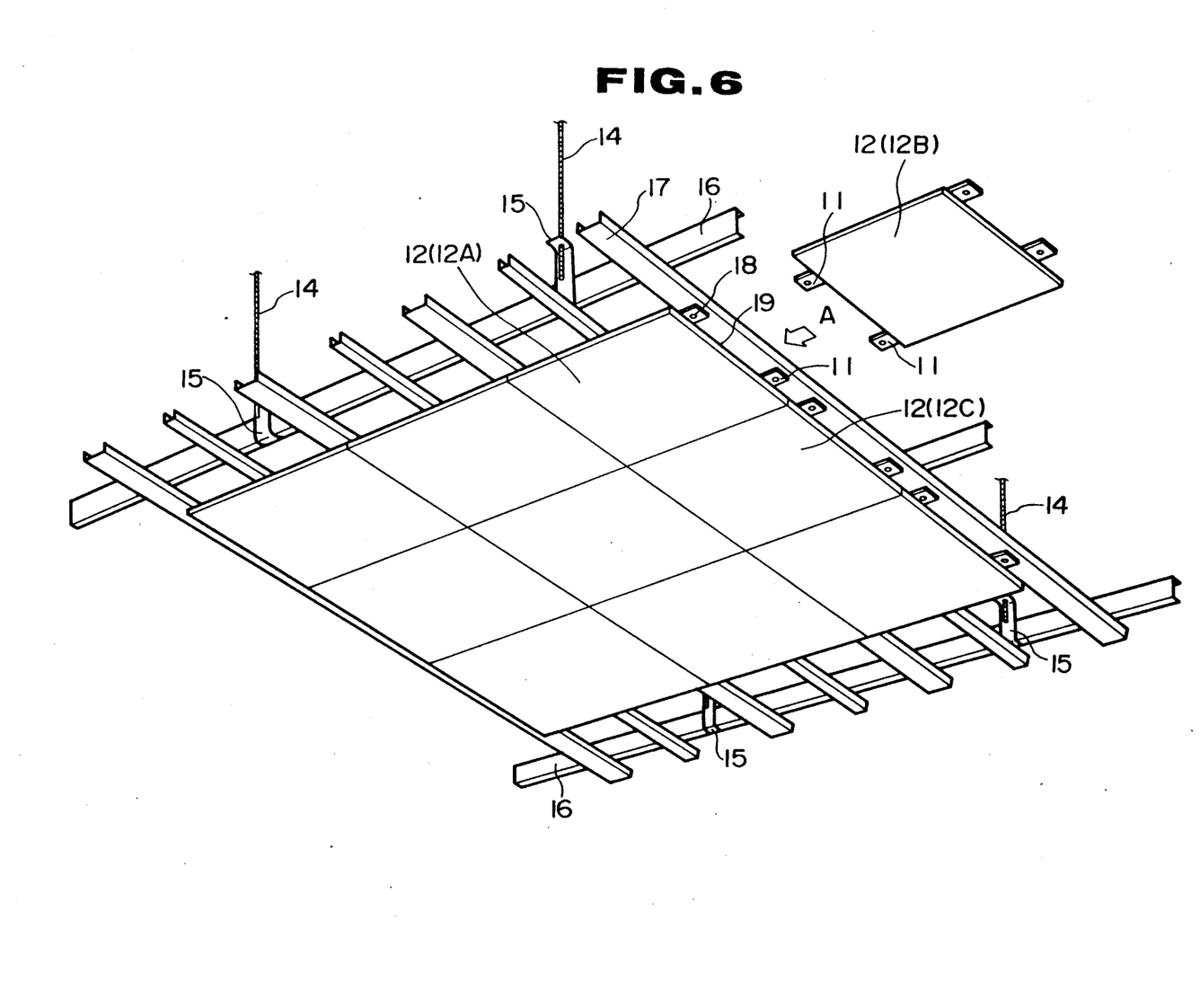
FIG. 6 is a perspective view illustrating the situation in which the porous panel boards shown in FIG. 4 are constructed in the ceiling.

As shown in FIG. 6, said aluminum sound-absorbing panel board 12 joined with metal fittings 11 by applying the method according to this invention is fixed to a base frame 17 suported by a beam 16 which is holded by bracket 15 connected with a hanger bolt 14 at its screw part adjustably in the vertical direction by tightening screws 18 into said base frame 17 through the screw holes 11c of the metal fittings 11 joined to the aluminum sound-absorbing panel board 12. Subsequently, another aluminum sound-absorbing panel board 12 (12B) is fixed by inserting the metal fittings 11 fixed to the one side thereof into a gap 19 formed between the base frame 17 and the aluminum sound-absorbing panel board 12 (12A) fixed to said base frame 17 previously in the direction of the arrow A, and fixing the metal fittings 11 fixed to another side thereof to the base frame (not shown) with screws. Hereupon, said panel board 12 provided with the metal fittings 11 in symmetry of location to the respective side thereof has not directionality, so that when the metal fittings 11 of any one side are inserted into the gap 19, the metal fittings 11 of another side can be fixed to the base frame with the screws 18.

Said metal fittings 11 may be joined to the upper and lower side of the aluminum sound-absorbing panel board 12 shown in FIG. 4 furthermore. Thereby, panel boards 12 (12A and 12C) contiguous in the direction of the base frame 17 are also engaged with each other, it is possible to fix the panel boards 12 securely, and said aluminum sound-absorbing panel board 12 can be so structured as to remove the difference in level at the connecting line.

Figure 7:
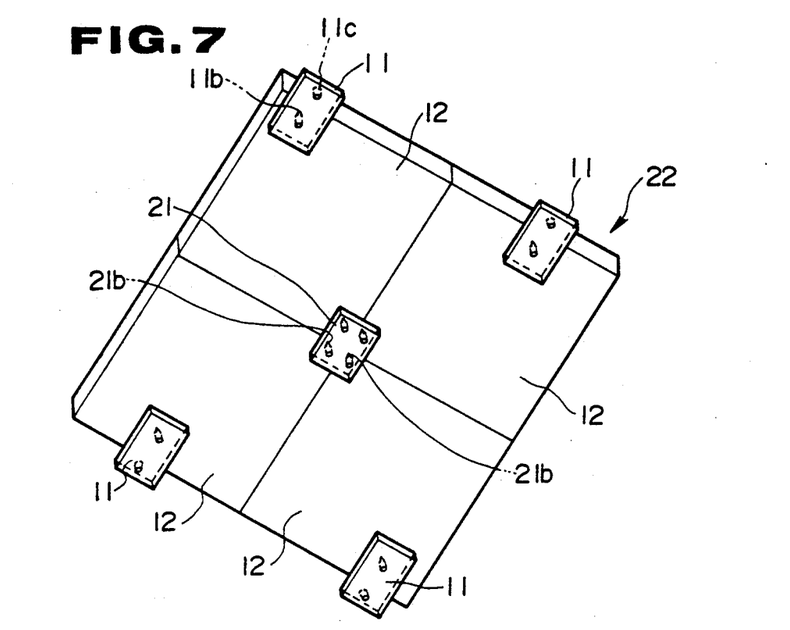
FIG. 7 is a perspective view illustrating another example of the porous panel board joined with the metal fittings by applying the method according to this invention.

In another example, four panel boards 12 arranged in square form one unit as shown in FIG. 7.

Namely, four aluminum sound-absorbing panel boards (500×500×2 mm) 12 are butted together in square, and an aluminum-connective metal (40×40×2 mm) 21 provided with four projections 21b is laid at the center across four panel boards 12. Said connective metal 21 is joined to the respective panel boards 12 by passage of an electric current after forming the dense portion on the panel boards 12 by applying pressure and pressing the respective projections 21b into the panel board 12. Consequently, the aluminum sound-absorbing panel board 22 having a size of 1000×1000×2.5 mm is obtained. Furthermore, metal fittings (40×80×2 mm) 11 are joined to the opposite sides of said panel board 22 having four times size by passage of an electric current after forming the dense portion in the same manner as described above.

Said aluminum sound-absorbing panel board 22 having four times size can be fixed to the base frame 17 or the like in the same manner as said panel board 12, but it is preferable to fit the panel board 22 to the place where said panel board 22 is hard to deform due to its own weight (for example, a wall of a building and so on). In that case, there is advantage in that it is possible to reduce the required number of the metal fittings 11 and the total man-hour required for the construction as compared with the case using said panel board 12.

Figure 8:
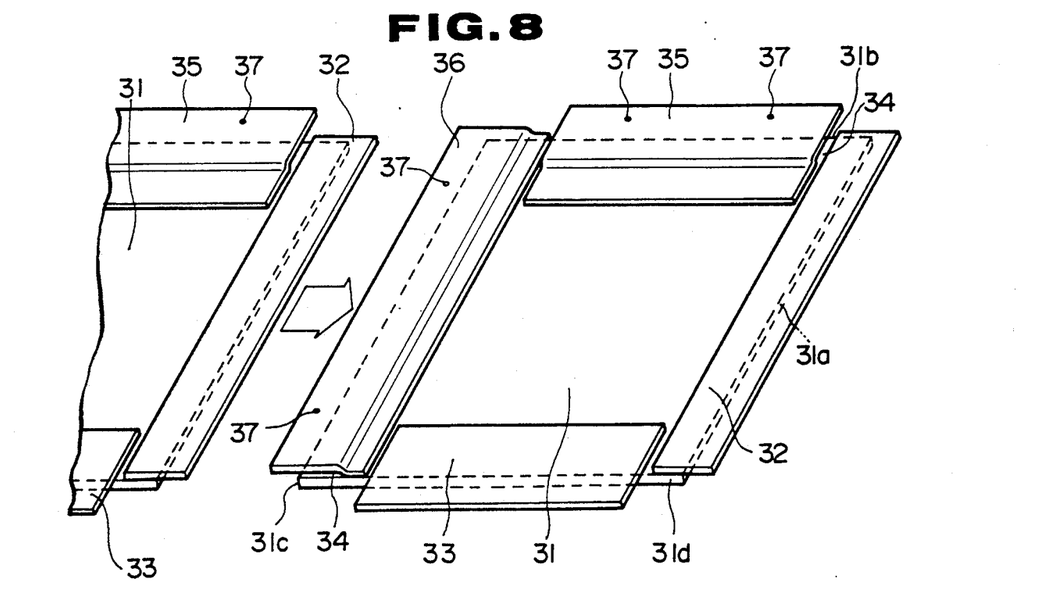
FIG. 8 is a perspective view illustrating still another example of the porous panel board joined with the metal fittings by applying the method according to this invention.
Figure 9:
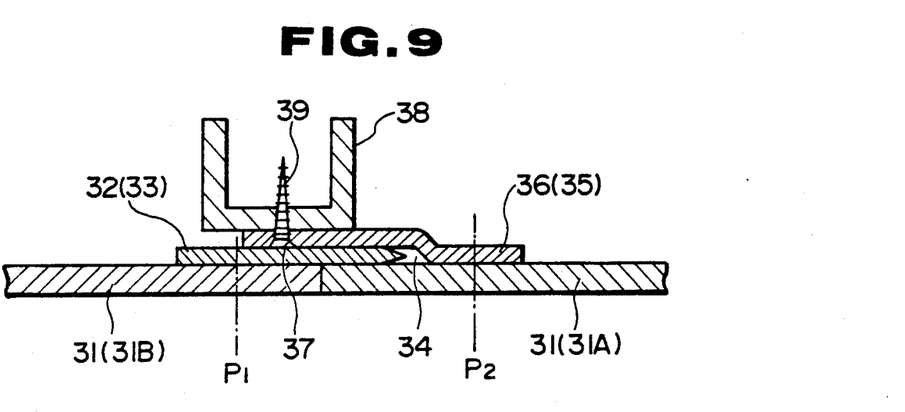
FIG. 9 is an enlarged sectional view illustrating the structure for fixing the porous panel board shown in FIG. 8 to the base frame.

FIGS. 8 and 9 show another example of the porous metallic panel board joined with the metal fittings, that are non-porous metallic members by applying the method according to this invention.

A rectangular porous panel board 31 (31A, 31B) is provided with flat plate-shaped metal fittings 32 and 33 on two sides 31a and 31d contiguous to each other on the reverse side thereof. Said metal fittings 32 and 33 are so fixed as to protrude from said sides 31a and 31d, as to cover almost the full length of the sides 31a and 31d (said metal fitting 33 is shorter than the full length of the side 31d a little) as shown in FIG. 8.

The porous panel board 31 is also provided with offset metal fittings 35 and 36 on two sides 31b and 31c oppositing to said two sides 31a and 31d in the reverse side thereof. Said metal fittings 35 and 36 are so offset as to form gaps 34 making it possible to insert flat-plate shaped metal fittings 32 and 33 provided to an adjacent porous panel board 31 (31B), and so fixed as to cover almost the full length of the sides 31b and 31c (said metal fitting 35 is shorter than the full length of the side 31b a little) as shown in FIG. 8.

At the occasion of fixing metal fittings 32, 33, 35 and 36 to the porous panel boards 31, at first, putting the metal fittings 32, 33, 35, and 36 provided with projections at the positions $P_1$ and $P_2$ of the joining surfaces thereof on the porous panel boards 31 as shown in FIG. 9 and pressurizing them, partially dense portions are formed in the joining surfaces of the porous panel boards 31 by pressing the projections into said porous panel boards 31 and crushing pores existing in the vicinity of the projections. Subsequently, passing an electric current in this state, said projections and dense portion are melted, thereby said metal fittings 32, 33, 35, and 36 are joined to the porous panel boards 31.

Said offset metal fittings 35 and 36 are provided with screw holes 37 and said flat plate-shaped metal fittings 32 and 33 have tapered edges so as to facilitate the inserting into said gaps 34.

In fitting the porous panel board 31 provided with the metal fittings 32, 33, 35, and 36 to a baseframe 38 shown in FIG. 9, first of all, the porous panel board 31 (31A) is fixed to the base frame 38 at the side 31c through the offset metal fitting 36 by tightening a screw 39 passed through the screw hole 37 provided to said metal fittings 36 into the base frame 38. Next, flat-plate shaped metal fittings 32 provided to the adjacent porous panel board 31 (31B) is inserted into the gap 34 formed between the said metal fittings 36 and said porous panel board 31 (31A).

In such a manner, after fitting the porous panel boards 31 (31A, 31B, . . . , . . . ,) in the first row to the base frame 38, the fitting of the porous panel boards 31 is started in the second row. Namely, flat-plate shaped metal fitting (33) provided to another porous panel board (31) is inserted into the gap 34 formed between said porous panel board 31 (31A) and the offset metal fittings 35 provided to said porous panel board 31 (31A), and offset metal fittings (36) provided to said another porous panel board (31) is fixed to said base frame 38 using a screw (39). The above described work is carried on repeatedly.

At this time, the crook-shaped metal fitting 36 is fixed to the base frame 38 with the screw 39, so the crook-shaped metal fitting 35 is not always necessary to be fixed to another base frame crossing at right angle to said base frame 38, but said metal fitting 35 may be fixed to said another base frame according to need.

Figure 10:
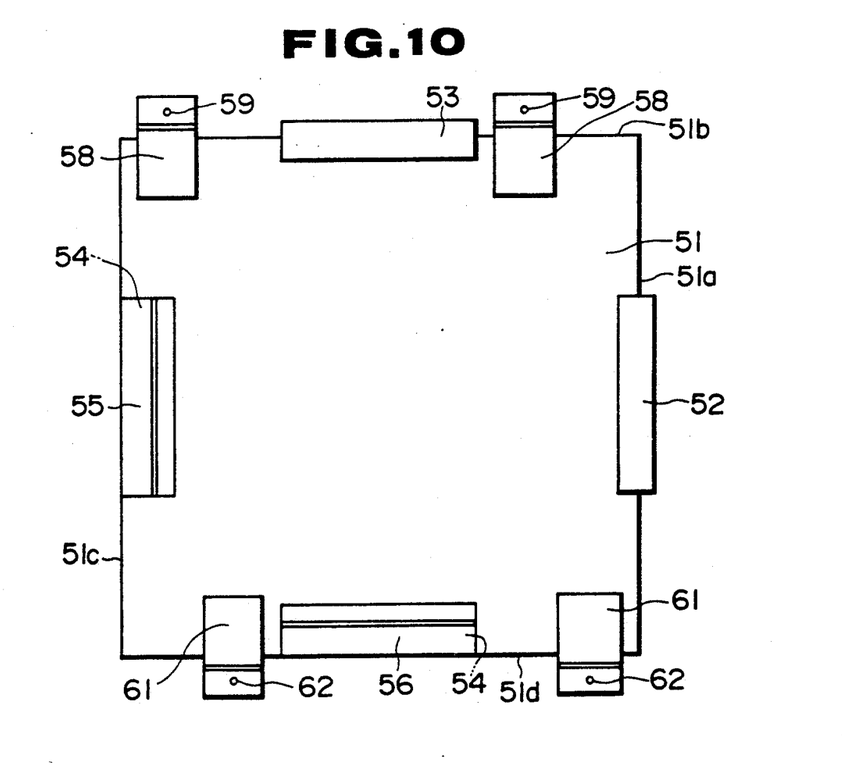
FIG. 10 is a plan view illustrating a further example of the porous panel board joined with the metal fittings by applying the method according to this invention.
Figure 11:
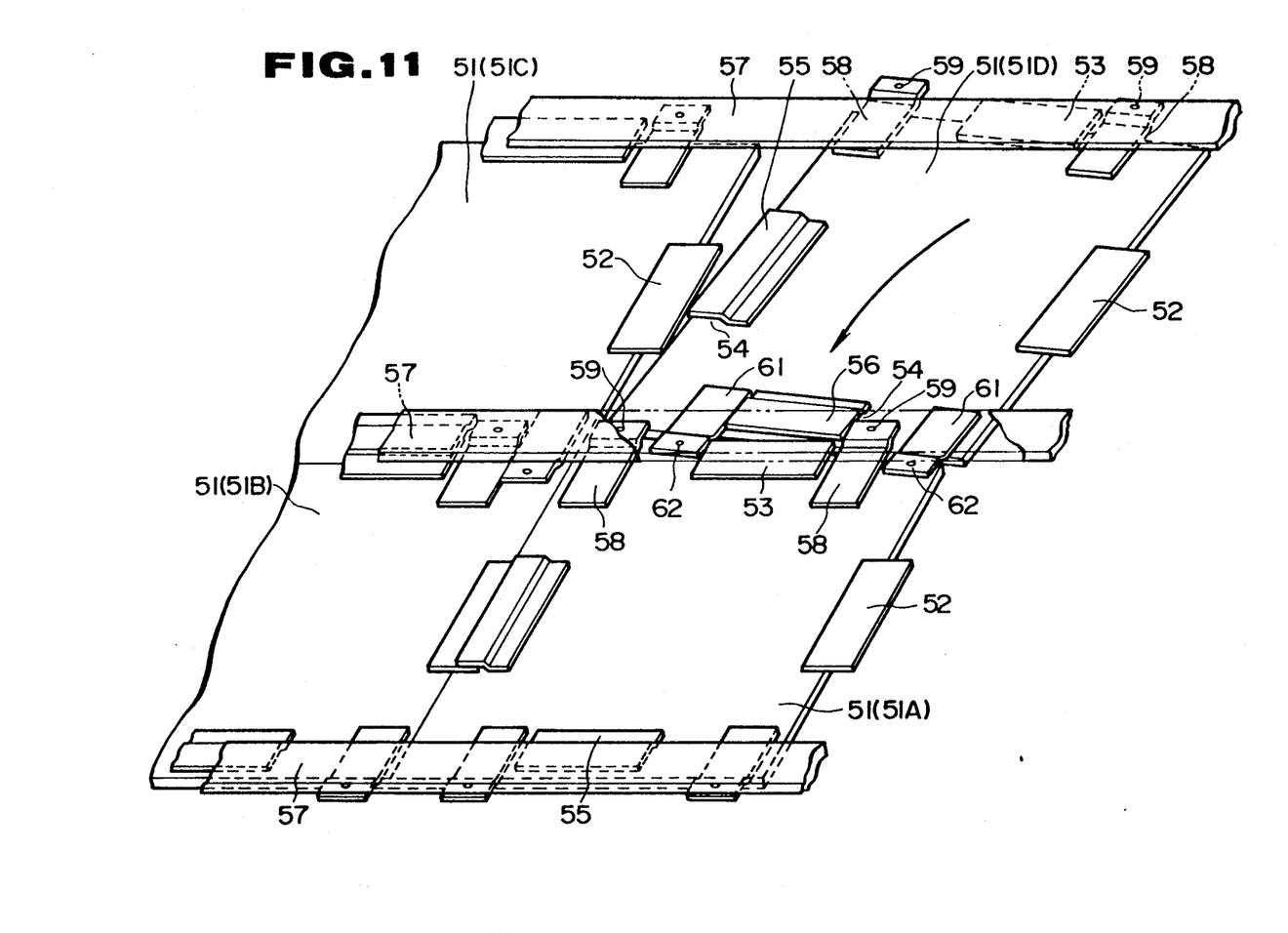
FIG. 11 is a perspecting view illustrating the fixing procedure for the porous panel board shown in FIG 10.

FIGS. 10 and 11 show another example of the porous metallic panel board joined with the metal fittings, that is non-porous metallic member by applying the method according to this invention.

As shown in FIG. 10, a rectangular porous panel board 51 is provided with flat-plate shaped metal fittings 52 and 53 in the approximate center of two sides 51a and 51b contiguous to each other in the reverse side thereof. Said metal fittings 52 and 53 are about one-third of the length of said sides 51a and 51b, and so fixed as to protrude from said sides 51a and 51b.

The porous panel board 51 is also provided with offset metal fittings 55 and 56 on two sides 51c and 51d opposite to said two sides 51a and 51b in the reverse side thereof. Said metal fittings 55 and 56 are about one-third of the length of sides 51c and 51d, and so fixed as to form a gaps 54 possible to insert flat-plate shaped metal fittings 52 and 53 provided to another porous panel board 51 (51A, 51B) adjacent shown in FIG. 11.

Furthermore, offset metal fittings 58 provided with a screw hole 59 are fixed by both sides of said flat-plate shaped metal fittings 53 on the side 51b to which said metal fittings 53 is fixed. The offset metal fittings 61 provided with a screw hole 62 are also fixed to positions which are near by both sides of said offset metal fittings 56 and, are symmetrically located with respect to said metal fittings 58 on the side 51d to which said metal fittings 56 are fixed.

Also in this example, said metal fittings 52, 53, 55, 56, 58 and 61 are provided with projections, and are joined to said panel board 51 by passage of an electric current after forming the dense portions on the joining surfaces of said porous panel boards 51 by pressing said projections into said porous panel boards 51 in the same manner as described in afore-mentioned examples.

At the occasion of fitting the porous panel board 51 provided with metal fittings 52, 53, 55, 56, 58 and 61 along base frames 57, at a state in which the porous panel board 51 (51A) is fitted to the base frame 57 by fixing the offset metal fittings 58 to said base frame 57 using screws passed through the screw holes 59, the offset metal fittings 61 provided to an adjoining porous panel board 51 (51D) is inserted into the gap formed between said porous panel board 51 (51A) and the base frame 57, and the flat-plate shaped metal fittings 53 are inserted into the gap formed between the adjoining porous panel board 51 (51D) and the offset metal fittings 56 simultaneously. The flat-plate shaped metal fitting 52 provided to an adjacent porous panel board 51 (51C) is inserted into a gap formed between said porous panel board 51 (51D) and the crook-shaped metal fittings 55, subsequently the offset metal fittings 58 of said porous panel board 51 (51D) are fixed to another base frame 57 using screws.

In such a manner, a large number of porous panel boards 51 (51A, 51B, 51C, 51D, . . .) are fitted side by side by repeating the fixing to the base frame 57 with screws and the inserting into the gap alternately.

Such porous panel boards having afore-mentioned structure are engaged with each other by metal fittings provided on at least two sides thereof, and so it is possible to remove an occurrence of deflection even when a porous panel board of larger size is used, and possible to maintain the porous panel board fitted to the base frame in good condition.

As mentioned above, a method for joining metallic members according to this invention consists of putting a joining surface of a porous metallic member against a joining surface of a non-porous metallic member having a projection on the joining surface, pressurizing said both metallic members in direction contact with each other and forming a dense portion on the joining surface of said porous metallic member by pressing the projection provided on the joining surface of said non-porous metallic member into said porous metallic member, and subsequently heating and joining said both metallic members by passage of an electric current. Therefore, an excellent effect is obtained that it is possible to join the porous metallic member and the non-porpus metallic member very firmly without using screws or adhesives, for example, it is possible to join the porous metallic panel board with the metal fittings for fitting said panel board which is the non-porous metallic member very firmly without deterioration in external appearance.

What is claimed is:

1. A method for joining metallic members which comprises:

placing a joining surface of a porous metallic member in contact with a joining surface of a non-porous metallic member having a projection on the joining surface thereof, pressing said metallic members against each other and forming a dense portion in the joining surface of said porous metallic member by pressing the projection provided on the joining surface of said non-porous metallic member into said porous metallic member, and subsequently heating and joining said both metallic members by passage of an electric current through both metallic members, wherein said porous metallic member is a porous panel board, and said non-porous metallic member is a metal fitting for mounting said porous panel board.

2. A method for joining metallic members as set forth in claim 1, wherein said porous panel board is an aluminum sound-absorbing panel board.

* * * * *